United States Patent [19]

Miyoshi et al.

[11] Patent Number: 5,110,103
[45] Date of Patent: May 5, 1992

[54] IMAGE FORMING APPARATUS WITH IMPROVED DOCUMENT FEEDER

[75] Inventors: Jun Miyoshi, Higashiosaka; Hiroyuki Nagai, Toyonaka, both of Japan

[73] Assignee: Mita Industrial Co., Ltd., Osaka, Japan

[21] Appl. No.: 378,124

[22] Filed: Jul. 11, 1989

[30] Foreign Application Priority Data

| Jul. 12, 1988 | [JP] | Japan | 63-92348 |
| Jul. 12, 1988 | [JP] | Japan | 63-172955 |
| Jul. 12, 1988 | [JP] | Japan | 63-172956 |
| Nov. 25, 1988 | [JP] | Japan | 63-299213 |
| Nov. 25, 1988 | [JP] | Japan | 63-299214 |
| Nov. 30, 1988 | [JP] | Japan | 63-302651 |

[51] Int. Cl.$^5$ .................................... B65H 5/22
[52] U.S. Cl. ..................... 271/3; 271/109; 271/225; 271/275; 271/184; 355/75
[58] Field of Search ............ 355/25, 75; 271/3.1, 271/3, 34, 109, 117, 264, 7, 4, 225, 275, 902, 184

[56] References Cited

U.S. PATENT DOCUMENTS

| 3,988,065 | 10/1976 | Mileski et al. | 355/75 X |
| 4,190,359 | 2/1980 | Murayama et al. | 355/75 |
| 4,439,036 | 3/1984 | Davis et al. | 355/25 X |
| 4,896,189 | 1/1990 | Akuzawa | 355/75 |

FOREIGN PATENT DOCUMENTS

| 0068857 | 9/1982 | Japan | 355/75 |
| 0118551 | 6/1985 | Japan . | |
| 172171 | 7/1989 | Japan | 271/902 |

Primary Examiner—Robert P. Olszewski
Assistant Examiner—Boris Milef
Attorney, Agent, or Firm—Beveridge, DeGrandi & Weilacher

[57] ABSTRACT

An image forming apparatus has an automatic original feeder for conveying an original along a path to a transparent platen. This automatic original feeder conveys the original to a position where it lies between the platen and an original conveying device which is disposed on a frame which can cover the transparent platen. The frame is rotatably supported by a supporting member. This supporting member is attached movably up and down relative to the main body of the apparatus and it is elastically urged downward. This biases the original conveying device downwardly, so that the pressure applied to the original by the original conveying device is properly maintained, thereby ensuring reliable conveyance of the original. Clearances between the original conveying device and an original cover plate on the frame are covered with clearance covering members, thereby to prevent an outline of the original conveying device from appearing in a transferred image. The supporting member can be attached to the main body of the apparatus through an adapter member, thereby allowing a single model of automatic original feeder to be mounted on different types of image forming apparatuses. The original conveying device is reversible, the transparent platen has an inclined surface at its infeed/outfeed end, and the feeder has holding extensions which hold down the infeed end of the platen on opposite sides of the original's path.

19 Claims, 9 Drawing Sheets

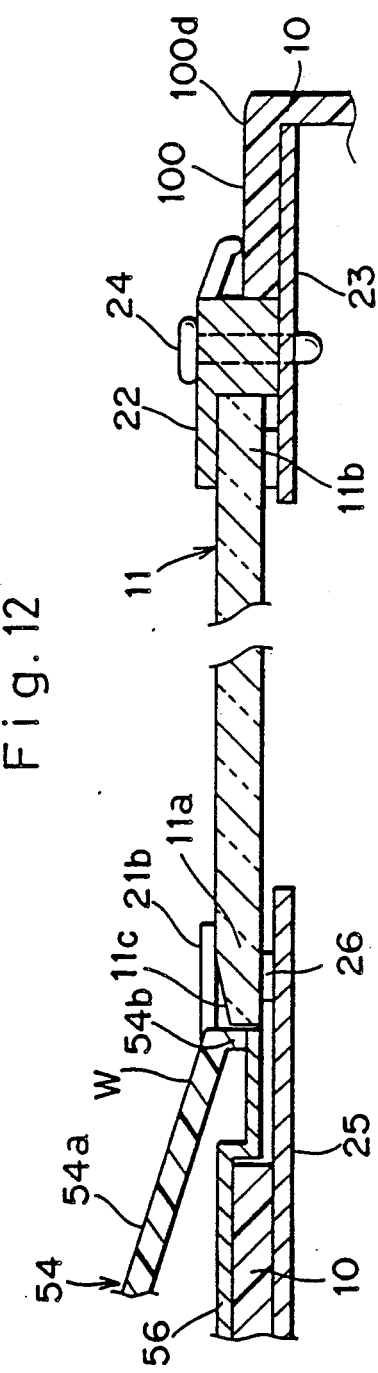
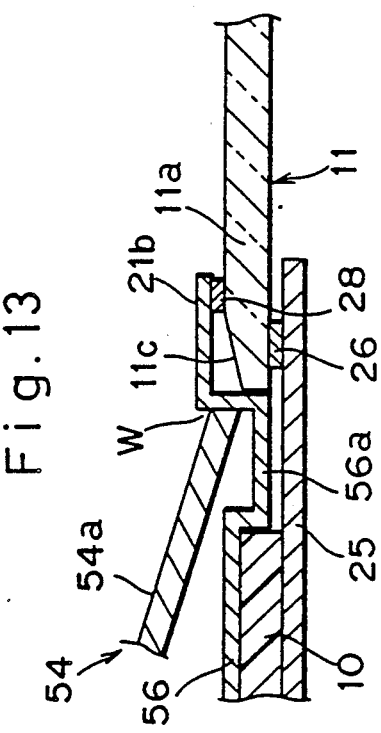
Fig.12
Fig.13

IMAGE FORMING APPARATUS WITH IMPROVED DOCUMENT FEEDER

BACKGROUND OF THE INVENTION

The present invention relates to an image forming apparatus provided with an automatic original feeder for conveying an original with it being interposed between a transparent platen and original conveying means.

Conventionally, there has been known an electrophotographic copying apparatus provided with an automatic original feeder for automatically conveying an original to a transparent platen.

The above described automatic original feeder generally has a frame, original conveying means provided on this frame, and original feeding means for feeding an original to this original conveying means.

The above described frame is pivotable between such a closed position as to cover the transparent platen and such an opened position as to expose the transparent platen. The original feeding means is adjacent to the above described frame, and it feeds originals to the original conveying means one at a time. The original conveying means conveys the original fed by the original feeding means to a required position on the transparent platen and conveys the original from the transparent platen to the upper surface of the frame after exposing the original to light while scanning is terminated (see, for example, Japanese Patent Laid-Open Gazette No. 118551/1985). This original conveying means is constituted by an endless delivery belt mounted on almost the entire lower part of the frame.

On the other hand, in order to simplify the structure of the electrophotographic copying apparatus, the applicant of the present invention has proposed a delivery roller type automatic original feeder (see Japanese Patent Application No. 61333/1988). This automatic original feeder uses as the document conveying means a delivery roller which is mounted on the lower part of a frame and can abut on the upper surface of a transparent platen, which conveys an original to and from the transparent platen with it being interposed between this delivery roller and one end of the original platen according to forward and reverse rotation of the delivery roller.

However, in an electrophotographic copying apparatus of an intermediate degree or less, a frame is not a high strength frame made of steel or the like but of monocoque construction so as to simplify the structure and reduce the cost, so that the frame is liable to, for example, warped. Thus, this electrophotographic copying apparatus has the disadvantage in that an original can not be reliably conveyed because the pressure applied to the original by the original conveying means is changed due to, for example, the effect of the warping or the like and the variation in assembling precision.

In order to eliminate the disadvantage, there has been known an electrophotographic copying apparatus for adjusting the above described pressure by providing a height adjusting mechanism for adjusting the height of a frame from a transparent platen. In this electrophotographic copying apparatus, a supporting portion of the frame is fixed to a vertical plate provided on the main body thereof by a bolt and a nut and a portion penetrated by the bolt in the vertical plate is a slot. The above described height adjusting mechanism is used for adjusting the position in which the supporting portion is attached to the vertical plate. Accordingly, the adjustment must be carried out while lifting the frame, which is not easy. In addition, one of the bolt and the nut is arranged inside of the frame. Thus, the adjustment must be carried out with the frame being opened, which is troublesome.

Meanwhile, the above described delivery roller is arranged directly over the transparent platen at the time of conveying the original. Thus, the electrophotographic copying apparatus also has the disadvantage in that a good reproduced image can not be obtained because an outline or the like of the delivery roller is clearly copied on copy paper when the size of an original is so small that the delivery roller is forced out of the original in, for example, manually disposing the original or when an original permeable to light at the time of exposure to light such as a copy of a sheet for an OHP (Over Head Prejector) or a tracing paper is copied.

Furthermore, the above described image forming apparatus is generally provided with an original discharge passage in a predetermined position between the frame and the delivery roller and adapted to convey the original fed from the original feeding means through an original conveying passage to the transparent platen by forward rotation of the delivery roller as well as to convey the original from the transparent platen to the upper surface of the frame by way of the original discharge passage by reverse rotation of the delivery roller after termination of exposing the original to light while scanning.

Only an end of the above described transparent platen which is farther away from the original feeding means is pressurized to be fixed by a longitudinal fixing member. The reason is that it is difficult to convey the original from the transparent platen if an end of the transparent platen which is closer to the original feeding means is also fixed by the fixing member because the original is caught by the fixing member at the time of conveying the original from the transparent platen. In addition, the reason is that a guide member for introducing the original into the original discharge passage, which must be provided in the vicinity of the end of the transparent platen which is closer to the original feeding means, can not be provided in the end if the end is fixed by the above described fixing means.

Thus, the above described image forming apparatus also has the disadvantage in that the original is copied with an image forming position being shifted irrespective of accurately setting the original to a mark on the transparent platen because the position of the transparent platen is shifted due to the vibration caused at the time of exposing the original to light while scanning and the time of opening and closing an original cover. In addition, it has the disadvantage in that the transparent platen is cracked by the vibration of the transparent platen itself.

On the other hand, when the above described automatic original feeder is mounted on an image forming apparatus of a type of manually disposing an original on a transparent platen, a supporting member for rotatably supporting the above described frame is attached to a hole for attaching a conventional original cover on the upper surface of the main body thereof, thereby to mount the automatic original feeder to the main body of the image forming apparatus.

The position of the above mentioned hole for attaching an original cove differs by the types of image forming apparatuses. Thus, an automatic original feeder of plural specification having different arrangement of a supporting member of a frame is necessary according to the position of a hole for attaching an original cover of each type, which brings the disadvantage of cost increase.

SUMMARY OF THE INVENTION

An object of the present invention is to provide an image forming apparatus capable of properly maintaining the pressure applied to an original by original conveying means, to ensure reliable conveyance of the original.

Another object of the present invention is to prevent an outline of original conveying means from appearing in a transferred image.

Still another object of the present invention is to surely prevent the movement, the vibration or the like of a transparent platen without increasing the burden of cost.

A further object of the present invention is to make it possible to mount an automatic original feeder of a single specification on the main bodies of a plurality of types of image forming apparatuses to reduce cost.

The above described objects can be achieved by providing an image forming apparatus provided with an automatic original feeder for conveying an original which is interposed between a transparent platen and at least one original conveying means on a frame which can cover platen the transparent platen, which comprises at least one supporting member attached movably up and down to the main body of the image forming apparatus and pivotally supports the frame and urging means for elastically urging this supporting member downward.

Furthermore, the image forming apparatus provided with the automatic original feeder for conveying an original which is interposed between a transparent platen and at least one original conveying means on a frame which can cover the transparent platen may comprise at least one supporting member attached movably up and down to the main body of the image forming apparatus and rotatably supporting the frame, a shaft provided on this supporting member and having a screw portion fed through a through-hole of the main body of the image forming apparatus, and a nut threaded into the screw portion of this shaft for adjusting the height of the frame from the transparent platen.

Additionally, the image forming apparatus provided with the automatic original feeder for conveying an original with interposed between a transparent platen and at least one original conveying means on a frame which can cover the transparent platen may comprise an original cover plate provided on the frame and opposable to the transparent platen and at least one clearance covering member having almost the same color tone as those of the original conveying means and the original cover plate for covering a clearance between the original conveying means and the original cover plate.

The above described clearance covering member may be a body having a lot of fine flexible elements.

The above described body may be a pile material.

The above described clearance covering member may be synthetic paper affixed to the original cover plate.

The image forming apparatus is preferably constructed such that the above described original conveying means can convey an original from the transparent platen in the direction opposite to such a direction as to convey the original to the transparent platen, the above described automatic original feeder has original feeding means for feeding originals to the original conveying means one at a time, and the original feeding means has a pair of holding extensions for holding down the transparent platen in positions on both sides of an original conveying passage which is interposed therebetween.

Furthermore, the image forming apparatus provided with an automatic original feeder for conveying an original interposed between a transparent platen and at least one original conveying means on a frame which can cover the transparent platen may comprise an adapter member provided on an upper surface of the main body of the image forming apparatus and at least one supporting member attached movably up and down to this adapter member and rotatably supporting the frame.

In the image forming apparatus constructed according to the present invention, the above described supporting member for supporting the frame is held downward by an elastic member. Thus, when the frame is, for example, warped, the frame is held downward, thereby to properly maintain the pressure applied to the original by the original conveying means.

When a nut for adjusting the height of the frame from the transparent platen is threaded into the screw portion of the shaft provided on the supporting member, the above described pressure can be adjusted by performing a rotating operation of the nut to directly move the shaft up and down.

When the above described clearance is covered with at least one clearance covering member having almost the same color tone as those of the original conveying means and the original cover plate, an outline of the original conveying means can be prevented from being transferred to copy paper.

When the above described clearance covering member is a body of fine flexible elements, the body does not prevent an operation of the original conveying means.

When the above described body is a pile material, the piles need not be planted one at a time, so that the pile material can be easily replaced with a new one if the piles become dirty.

When the above described clearance covering member is the above described synthetic paper, the synthetic paper is in contact with the original conveying means while following the same. Accordingly, the synthetic paper does not prevent the operation of the original conveying means and the synthetic paper can be easily replaced with a new one.

When the above described original feeding means has the above described pair of holding extensions, the shift in the position of the transparent platen caused by the vibration of the transparent platen can be prevented without preventing the original from being conveyed from the transparent platen. In addition, it is simultaneously possible to mount the original feeding means on the main body of the image forming apparatus and to fix the transparent platen. Accordingly, the image forming apparatus thus constructed has a good operating performance and is favorable in cost.

When a supporting member for supporting the above mentioned frame is attached to an adapter member provided on an upper surface of the main body of the image forming apparatus, an automatic original feeder of a single specification can be mounted on the main bodies of a plurality of types of image forming apparatuses by changing the adapter member corresponding to the main body of the image forming apparatus to which the automatic original feeder is attached. Accordingly, cost reduction due to quantity production can be achieved.

BRIEF DESCRIPTION OF THE DRAWINGS

FIG. 12 and 13 are cross-sectional views showing a main part of the components which attach the transparent platen to the apparatus;

DESCRIPTION OF THE PREFERRED EMBODIMENTS

The embodiments will be described in detail in conjunction with the accompanying drawings.

Figure 3:
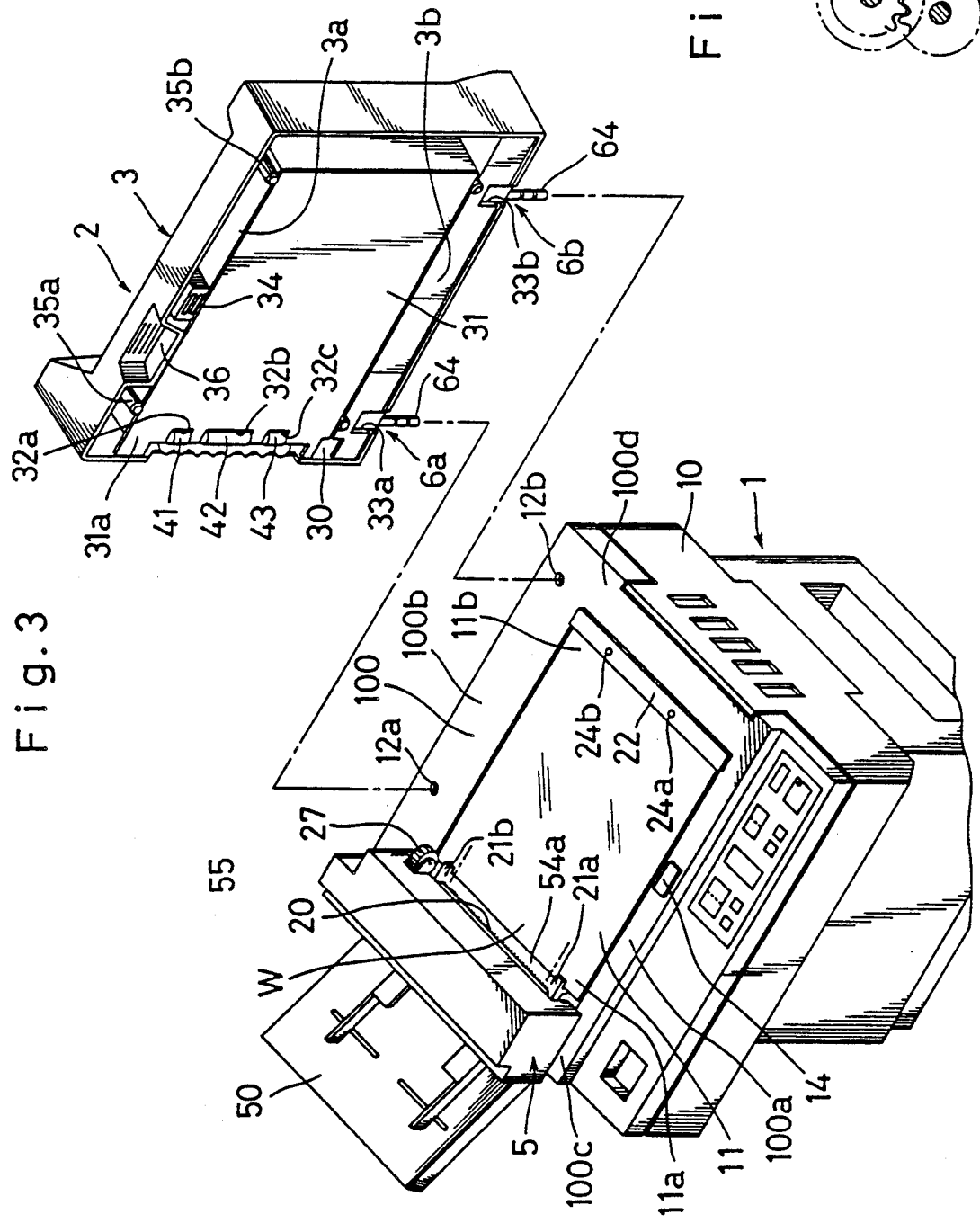
FIG. 3 is an exploded perspective view showing the whole of the image forming apparatus.

Referring to FIG. 3, an automatic original feeder 2 is attached to an upper surface 100 of a housing 10 in the main body of an electrophotographic copying apparatus 1. This automatic original feeder 2 has a frame 3, delivery rollers 41, 42 and 43 attached to this frame 3, and original feeding means 5 provided adjacent to the frame 3 for feeding an original to the delivery roller 41, 42 and 43.

The delivery rollers 41, 42 and 43 are the document-engaging portions of an original conveying means which moves original documents which are fed onto a transparent platen 11 by the original means feeding means 5. The platen is made of transparent contact glass and it is disposed on the upper surface 100 of the above described housing 10. Through-holes 12a and 12b are provided in a rear edge portion 100b of the upper surface 100 and a metal plate 14 is attached to a front edge portion 100a of the upper surface 100.

The above described frame 3 is attached to the housing 10 turnably between such a closed position as to cover the transparent planten 11 and such an opened position as to expose the transparent platen 11 and movably up and down by a pair of hinge units 6a and 6b. The frame 3 is made of resins or the like and has an original cover plate 31 in white or the like attached to its lower surface. Notch portions 32a, 32b and 32c are provided in one side 31a of this original cover plate 31. Recessed portions 33a and 33b on which the hinge units 6a and 6b are respectively disposed are provided on a lower surface of a rear edge portion 3b of the frame 3 in the closed position. A magnet 34, a pair of positioning members 35a and 35b and a recessed portion 36 are provided on a lower surface of a front edge portion 3a of the frame 3.

The magnet 34 adheres to the metal plate 14 on the upper surface 100 of the housing 10 with the frame 3 being in the closed position, to hold the closed state of the frame 3 by a predetermined holding force. The positioning members 35a and 35b abut on the upper surface 100 of the housing 10 to receive a part of the load of the frame 3 with the frame 3 being in the closed position as well as determine the height of the front edge portion 3a of the frame 3 from the transparent platen 11. The concave portion 36 is used when the front edge portion 3a of the frame 3 is lifted by inserting a finger to rotate the frame 3 such that the position thereof is changed from the closed position to the opened position.

Figure 1:
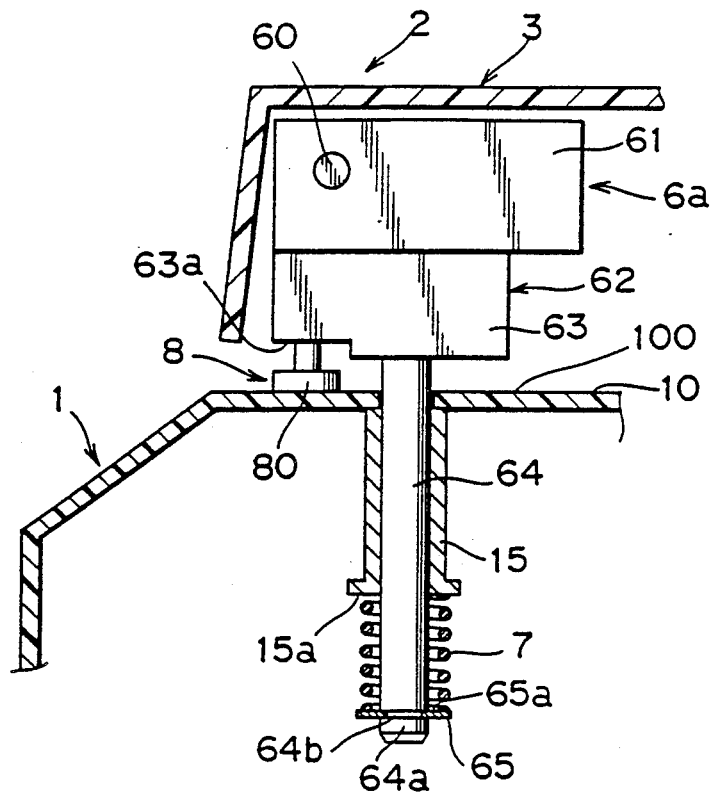
FIG. 1 is a cross-sectional view showing the frame-supporting assembly of an image forming apparatus according to an embodiment of the present invention.
Figure 2:
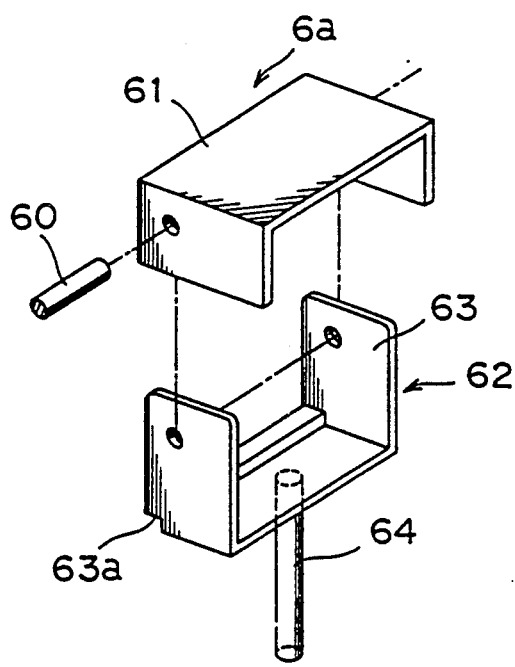
FIG. 2 is an exploded perspective view of a hinge unit.

Referring to FIGS. 1 to 2, the above described hinge unit 6a comprises a pin 60, and an upper member 61 and a lower member 62 rotatably connected to each other by the pin 60. The upper member 61 is formed of a channel material 63 opened downward which is adhered to the concave portion 33a of the frame 3. The lower member 62 has a shaft 64 extending downward provided on a lower surface 63a of the channel material 63 opened upward. This shaft 64 penetrates slidably up and down the through-hole 12a of the housing 10. The above described hinge unit 6b has the same structure as that of the hinge unit 6a.

The through-hole 12a is formed of a pipe material 15 adhered to the housing 10 in the main body of the electrophotographic copying apparatus 1, as shown in FIG. 1. The through-hole 12b has the same structure as that of the through-hole 12a. A spring washer 65 is removably fit to a groove portion 64b in an end 64a of the shaft 64. A compression coil spring 7 penetrated by the shaft 64 is movably fit between an upper surface 65a of the spring washer 65 and a lower surface 15a of the pipe material 15. The shaft 64 is urged downward by the compression coil spring 7, so that the hinge unit 6b is urged downward. Similarly, the hinge 6b is urged downward.

A bolt 8 is threaded into the channel material 63 of the hinge unit 6a with a top 80 thereof abutting on the upper surface 100 of the housing 10. The bolt 8 regulates the downward movement of the hinge unit 6a urged downward by the compression coil spring 7. The vertical position of the hinge unit 6a is adjusted according to the amount of projection of the bolt 8 from the lower surface 63a of the channel material 63. Similarly, the vertical position of the hinge unit 6b is adjusted. The minimum height of the frame 3 from the transparent platen 11 is adjusted by the adjustment of the vertical position of each of the hinge units 6a and 6b. The height of the frame 3 from the transparent platen 11 is adjusted such that the original cover plate 31 is in an almost horizontal state with the frame 3 being in the closed position and a clearance of approximately 1 mm occurs between the original cover plate 31 and the transparent platen 11.

Meanwhile, the above described hinge units 6a and 6b are respectively provided with opened state holding mechanisms (not shown) each using a link mechanism, a tension spring or the like so as to maintain the frame 3 in the opened state.

The hinge units 6a and 6b rotatably supporting the frame 3 are supported movably up and down in the housing 10 in the main body of the electrophotographic copying apparatus 1, thereby to make it possible to cope with a thick original such as a book.

The above described hinge units 6a and 6b are respectively urged downward by the compression coil spring 7. Thus, the frame 3 is held downward when the frame 3 is, for example, warped. Thus, the pressure applied to the original by the delivery rollers 41, 42 and 43 can be properly maintained so that the original can be reliably conveyed. Moreover, in the above described embodiment, a floating force is produced for the frame 3 by the upward contact reaction which a transfer gear 38(FIG. 4) receives from a driving transfer gear 27 while driving the automatic original feeder 2. The pressure applied to the original by the delivery rollers 41, 42 and 43 can be properly maintained against this floating force exerted by drive gear 27, so that the original can be reliably conveyed.

Since the hinge units 6a and 6b are respectively provided with bolts 8 capable of adjusting the minimum height of the frame 3 from the transparent platen 11, the height of the frame 3 from the transparent platen 11 at the time of conveying the original can be properly maintained by adjusting the bolts 8, so that the originals can be further reliably conveyed. In addition, since the bolts 8 are exposed to the outside, the above described adjustment is easily carried out.

Figure 5:
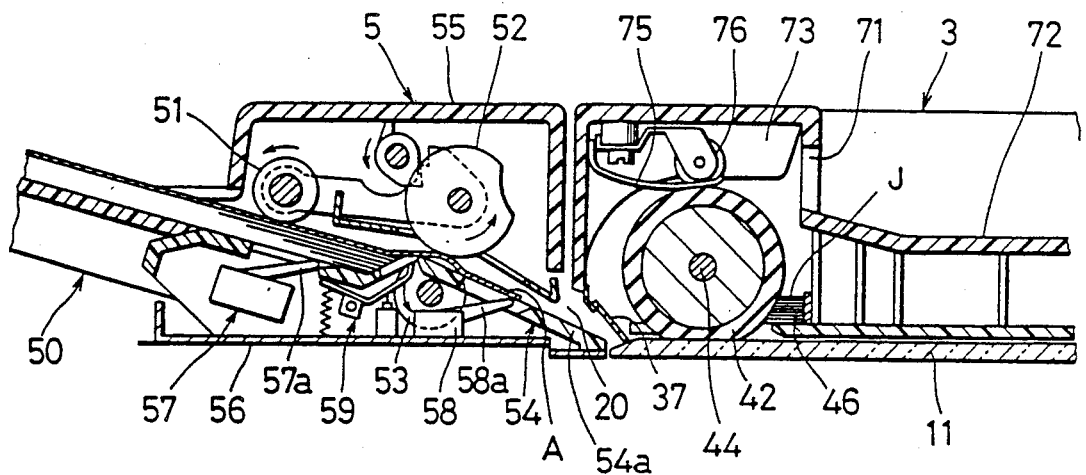
FIG. 5 is a cross-sectional view showing significant components of an automatic original feeder, including an original feeding means and an original conveying means.

Referring to FIGS. 3 and 5, the above described original feeding means 5 is attached to a slide edge portion 100c of the upper surface 100 of the housing 10 by connecting means such as a bolt. This original feeding means 5 has an original table 50, a first drive roller 51, a second drive roller 52, a reversing roller 53, a guide plate 54, an upper cover 55, a lower cover 56, an original set detector 57, an original feeding detector 58, and feeding preventing means 59.

The above described original table 50 is provided in an inclined manner. A sheet-like original P is disposed on this original table 50. The first drive roller 51 abuts on the upper surface of the sheet-like original P when required, to take out originals A in the direction of feeding (rightward in FIG. 5) along the original table 50 one at a time. The second drive roller 52 feeds the original A taken out by the first drive roller 51 to the delivery rollers 41, 42 and 43. The reversing roller 53 rotates in synchronization with the second drive roller 52, to prevent two or more originals from being simultaneously fed.

The above described guide plate 54 is provided on the extension of the original table 50. A lower end 54a of the guide plate 54 is exposed from an opening 20 for feeding the original, to guide the fed original A to the direction of feeding. The upper cover 55 covers an upper part of the first drive roller 51, the second drive roller 52 and the reversing roller 53. The lower cover 56 is formed in a bottom portion of the original feeding means 5 and directly attached to the housing 10. The original set detector 57 detects setting of the sheet-like original P on the original table 50 by upsetting of a bar 57a. The original feeding detector 58 detects feeding of the original by upsetting of a bar 58a. The feeding preventing means 59 prevents the original from being fed when it need not be fed.

The original feeding means 5 exposes the driving transfer gear 27 with it being adjacent to the guide plate 54, as shown in FIG. 3.

Referring to FIGS. 3 and 12, an end 11b of the transparent platen 11 which is farther away from the original feeding means 5, along with the side edge portion 100d of the upper surface 100 of the housing 10, is held down by a longitudinal holding member 22. This holding member 22 is fixed to a supporting plate 23 provided on the lower surface of the housing 10 by fixing means 24a and 24b such as a bolt.

An inclined surface 11c by chamfering is formed in an end 11a of the transparent platen 11 which is closer to the original feeding means 5. This inclined surface 11c performs the function of facilitating the introduction of the original conveyed from the original feeding means 5 into the transparent platen 11. An end of a guide member 37 (FIG. 5) attached to a predetermined position of the frame 3 is in contact with this inclined surface 11 c.

This guide member 37 is formed of, for example, a film of flexible synthetic resins such as polyester approximately 0.075 mm thick and picks up an original which has been exposed to light while being scanned in conveying the original from the transparent platen 11. A cushioning material 26 having elasticity such as rubber or the like is interposed between the end 11a of the transparent platen 11 and a supporting plate 25 provided below the housing 10.

A hanging portion 54b for holding a guide plate 54 at a predetermined height is formed in an end 54a of the guide plate 54, and a pair of holding extensions 21a and 21b for holding down the transparent platen 11 to fix the same is formed therein with they being projected in the horizontal direction. The holding convex portions 21a and 21b are provided in positions on both sides of the original conveying passage W (FIG. 3) which is interposed therebetween, to make it possible to convey the original to and from the transparent platen 11 without obstructing movement of the original.

Since the distal end 11b of the transparent platen 11 is held down by the holding member 22 and the infeed-/outfeed end 11a of the transparent platen 11 is held down by the holding extensions 21a and 21b, the shift of the position of the transparent platen 11 caused by vibrations is prevented. In addition, since the original feeding means 5 is provided with the holding extensions 21a and 21b, the transparent platen 11 can be fixed by only attaching the original feeding means 5 to the housing 10. Accordingly, the assembling work of the transparent platen 11 and the automatic original feeder 2 can be quickly and simply performed, which is preferable in cost.

Meanwhile, as shown in FIG. 13, the pair of holding extensions 21a and 21b can be also formed in a forward end 56a of the lower cover 56 of the original feeding means 5. In this case, the transparent platen 11 can be prevented from being damaged by the metallic lower cover 56 by interposing an elastic body 28 such as rubber between each of the above described holding extensions 21a and 21b and the end 11a of the transparent platen 11.

Figure 7:
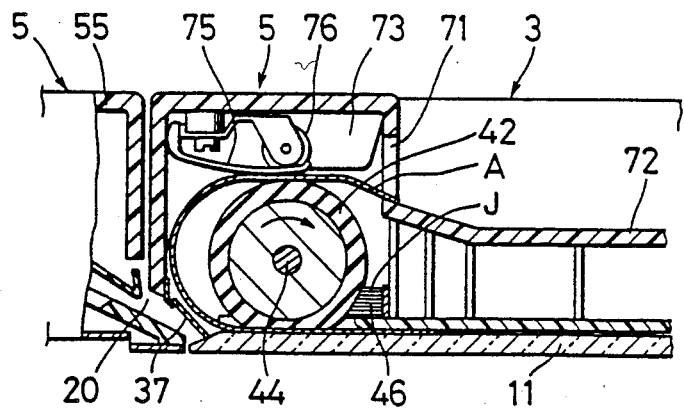
FIG. 7 is a cross-sectional view showing the original conveying means when the original is conveyed from the transparent platen.

The delivery rollers 41, 42 and 43 are respectively exposed from the above described notch portions 32a, 32b and 32c. The delivery rollers 41, 42 and 43 convey the original fed from the original feeding means 5 to a predetermined position on the transparent platen 11 by forward rotation (counterclockwise rotation in FIG. 5) as well as discharges the original which has been exposed to light while being scanned from an original discharge port 71 to an discharge tray 72 provided on an upper surface of the frame 3 by reverse rotation (clockwise direction in FIG. 5) (see FIG. 7).

Figure 6:
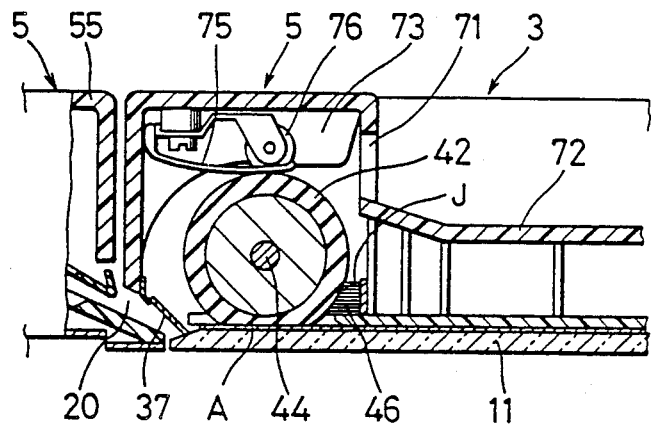
FIG. 6 is a cross-sectional view showing the original conveying means when an original is conveyed to a transparent platen.
Figure 8:
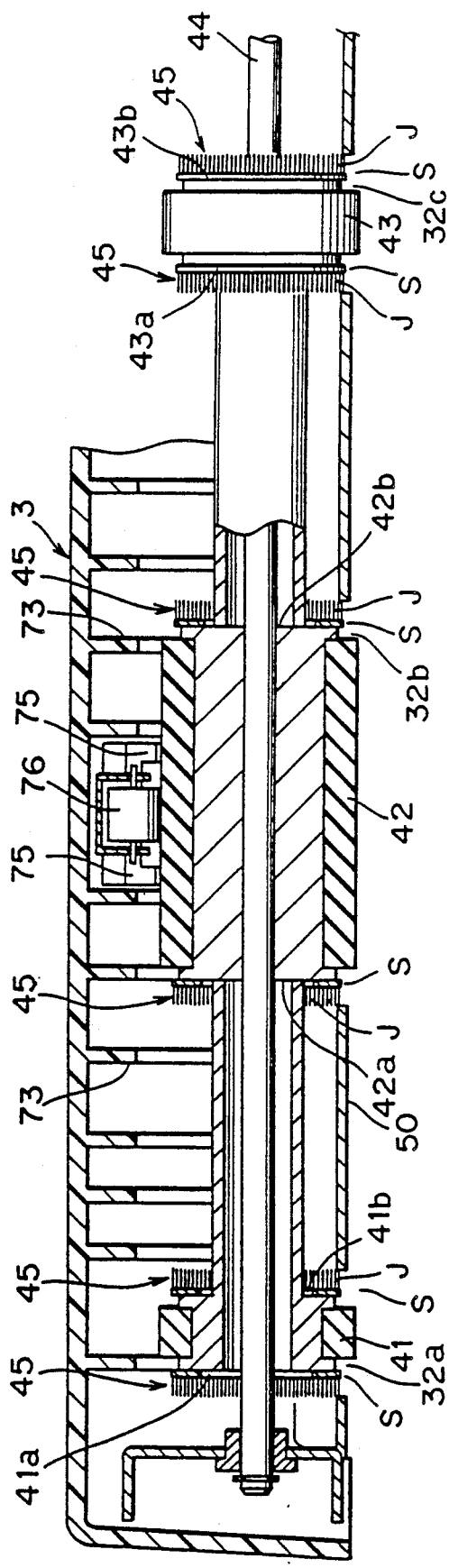
FIG. 8 is a sectional side elevation view of a delivery roller.

As shown in FIG. 8, the delivery rollers 41, 42 and 43 are arranged integrally rotatably around a single rotation axis 44. The delivery rollers 41, 42 and 43 convey the original such that at least a rear end of the original is interposed between the delivery rollers 41, 42 and 43 and the transparent platen 11 so as to convey the original from the transparent platen 11 at the time of reverse rotation (see FIG. 6).

Figure 17:
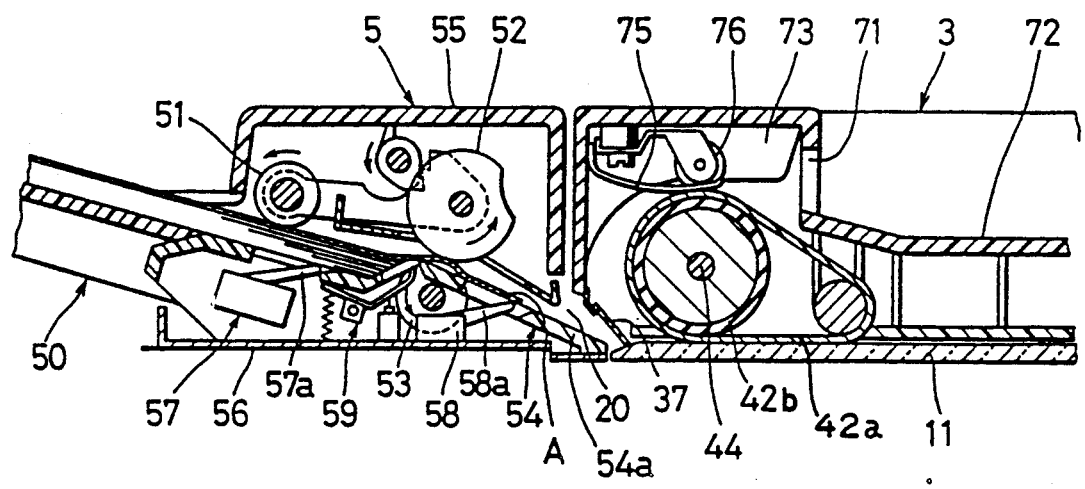
FIG. 17 is a view similar to FIG. 6, but showing an embodiment in which the original conveying means utilizes a delivery belt.

As shown in FIG. 17, the original conveying means 3 may have a delivery belt 42a which is driven by the driving drum 42 to convey an original on the transparent platen 11.

A plurality of guide ribs 73 for introducing the original to the original discharge port 71 hang in an internal upper portion of the frame 3 with suitable spacing in the crosswise direction. The original introduced by the guide ribs 73 is discharged from port 71 with it being interposed between the delivery roller 42 in the center as well as a pair of guide plates 75 and a driven roller 76 (see FIG. 7).

Figure 4:
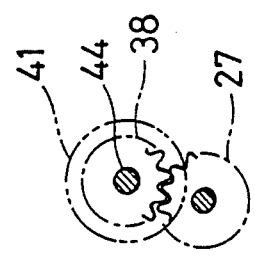
FIG. 4 is a diagram showing a structure of a driving transfer mechanism.

Referring to FIGS. 3 and 4, the transfer gear 38 connected to the rotation axis 44 of each of the delivery rollers 41, 42 and 43 is accommodated in a recessed portion 30. The transfer gear 38 engages with the above described driving transfer gear 27 entering the recess 30 from below with the frame being in the closed state. The driving transfer gear 27 and the transfer gear 38 engage with each other, so that the delivery rollers 41, 42 and 43 are operated simultaneously with the original feeding means 5.

Referring to FIGS. 5 and 8, clearances S between the delivery rollers 41, 42 and 43 and the original cover plate 31 are blocked with annular pile materials 45 and a pile materials 46 each having a lot of feathers J. The annular pile materials 45 are respectively attached to a pair of side end surfaces 41a and 4b of the delivery roller 41, a pair of side end surfaces 42a and 42b of the delivery roller 42, and a pair of side end surfaces 43a and 43b of the delivery roller 43 (see FIG. 8). The pile materail 46 is attached to the original cover plate 31 (see FIG. 5).

The annular pile materials 45 ans the pile material 46 have almost the same color tone as those of the delivery rollers 41, 42 and 43 and the original cover plate 31. In general, the delivery rollers 41, 42 and 43 and the original cover plate 31 are both white in the electrophotographic copying apparatus or the like. Thus, the annular pile matrials 45 and the pile material 46 are most preferably white but may be light-colored such as ligt yellow which does not affect a reproduced image. The reproduction of the shades of the clearances S on the copy paper can be prevented by the annular pile materials 45 and the pile material 46.

Any of the above described annular pile materials 45 and the pile material 46 is a fabric made of fiber such as nylon and rayon, which has an adhesive layer on the reverse side thereof. Any of the surfaces of the annylar pile materials 45 and the pile material 46 is densely covered with a lot of fine flexible elements J comprising a pile and a loop. The clearances S can be blocked by only affixing the annular pile material 45 and the pile material 46 to the delivery rollers 41, 42 and 43 and original cover plate 31. Accordingly, the annular pile materials 45 and the pile material 46 have the advantage of not requiring time or labor to plant the elements J one at a time as welll as of being able to be easily replaced when the flexible elements J become dirty. In addition, the rotation load of each of the delivery rollers 41, 42 and 43 is not practically increased and the durability of the annular pile materials 45 and the pile material 46 themselves is good because the above described elements J are so flexible that they do not prevent rotation of each of the delivery rollers 41, 42 and 43.

Figure 9:
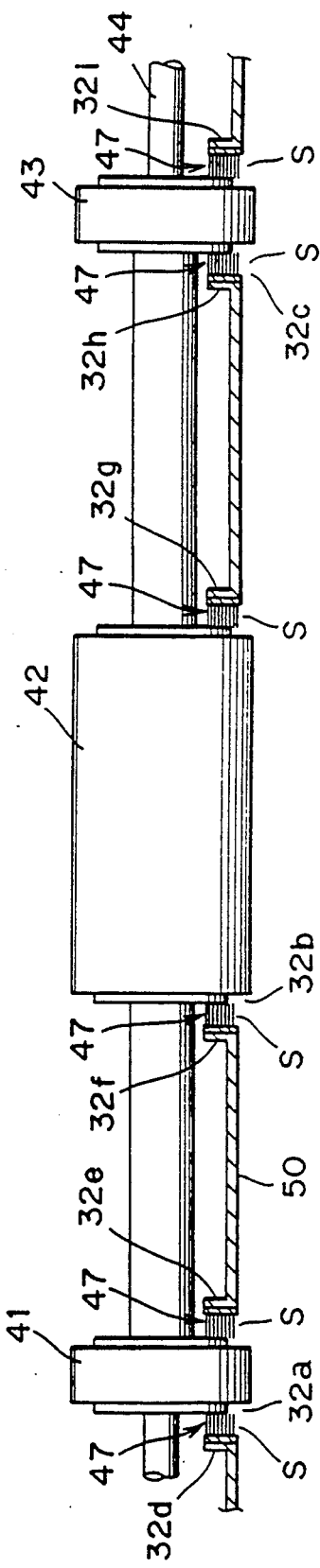
FIG. 9 ia a schematic diagram showing a modified example of a structure in the vicinity of the delivery roller.

Meanwhile, as shown in FIG. 9, pile materials 47 can be respectively attached to pairs of folded portions 32d and 32e, 32f, and 32g, and 32h and 32i formed by folding upward surfaces of the notch portions 32a, 32b and 32c of the original cover plate 31.

Other bodies with fine flexible elements such as felt and velvet can be used in place of the above described annular pile materials 45, pile material 46 and pile materials 47. This body must be so fine, flexible and dense that it does not prevent rotation of each of the delivery rollers 41, 42 and 43 and can considerably block the clearances S. In addition, the body can be also formed by a direct planting method such as a static planting method. The attachment of the annular pile materials 45, the pile material 46 and the pile materials 47 is not limited to affixing with the above described adhesive.

Figure 10:
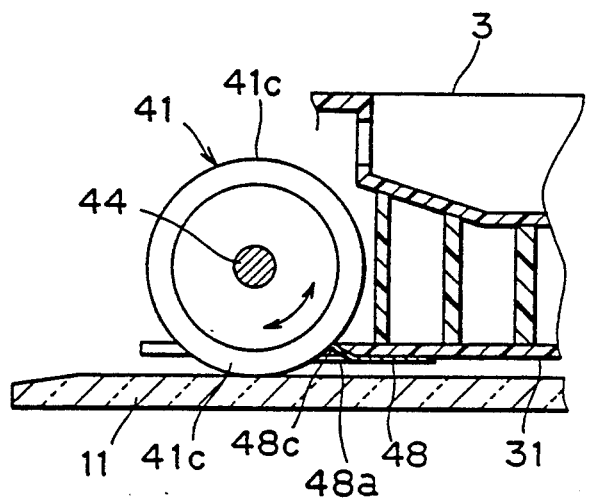
FIG. 10 is a cross-sectional view showing a structure in the vicinity of the delivery roller of an example in which synthetic paper is used.
Figure 11:
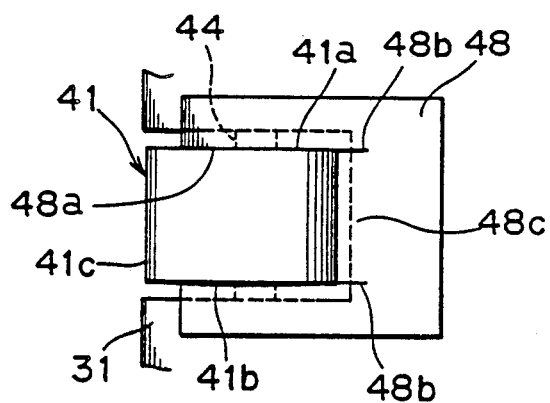
FIG. 11 is a bottom view showing a structure in the vicinity of the delivery roller, corresponding to FIG. 10.

Meanwhile, the above described clearances S can be covered with U-shaped synthetic paper 48 affixed to the lower surface of the original cover plate 31 with adhesive, as shown in FIGS. 10 and 11. An internal edge 48a of the synthetic paper 48 is brought into contact with a cylindrical surface 42c and both side end surface 41a and 41b of the delivery roller 41. The clearance between the delivery roller 42 and the original cover plate 31 and the clearance between the delivery roller 43 and the original cover plate 31 are covered with the synthetic paper in the same manner. A tongue member 48c deeply cut by a cutting line 48b is formed in the synthetic paper 48, the tongue member 48c greatly following forward and reverse rotation of each of the delivery rollers 41, 42 and 43.

The sysnthetic paper 48 is generally one mainly made of synthetic resins and having various properties of a natural paper added thereto.

This synthetic paper 48 preferably has the following properties in the Japanese Industrial Standards (merely referred to as JIS hereinafter).

Thickness: about 40~100 $\mu$m (JIS, P-8118)
Density: about 0.7 ~1 g/cm$^3$ (JIS, P-8118)
Whiteness: 90% or more (JIS, in conformity to L-1015 )
Opacity: 70% or more (JIS, P-8138)
Glossiness: about 5~20% (JIS, P-8142)
Tensile Strength (MD): 2 kg/15 mm or more (JIS, P-8113) (CD): 7 kg/15 mm or more (JIS, P-8113)

Tensile Expansion (MD): 80% or more (JIS, P-8132)
(CD): 25% or more (JIS, P-8132)
Tearing Strength (MD): 15 g or more (JIS, P-8116)
(CD): 10 g or more (JIS, p-8116)
Hardness (MD): 10 (S valve) or more (JIS, P-8143)
(CD): 15 (S valve) or more (JIS, P-8143)
Bursting: 3 kg/cm$^3$ or more (JIS, P-8112)
Folding Endurance: 10$^4$ times (JIS, P-8115)

Furthermore, the properties required for the synthetic paper 48 includes the property of being opaque and having almost the same color tone (white, light yellow or the like) as those of the lower surfaces of the delivery rollers 41, 42 and 43 and the original cover plate 31, the property of having durability such as abrasion resistance with respect to the contact with cylindrical surfaces of the delivery rollers 41, 42 and 43 which rotate in forward and reverse directions, the original to be conveyed, or the like, and the property of having little effect on the cylindrical surface of the delivery rollers 41, 42 and 43.

The synthetic paper 48 satisfying the required properties is, for example, "YUPO" made by Ojiyukagouseishi Corp. YUPO is mainly made of polypropylene resins, at least one surface of which is a sheet-like layer. YUPO of an FPG grade having high opacity, for example, the 40th to 110th YUPO (40 to 110 $\mu$m thick) and particularly, the 60th to 95th YUPO (60 to 95 $\mu$m thick) is preferably employed.

When the clearance S are covered with this synthetic paper 48, reproduction of outlines or the like of the delivery rollers 41, 42 and 43 on the copy paper can be prevented by the synthetic paper 48. In addition, the synthetic paper 48 can satisfactorily follow forward and reverse rotation of each of the delivery rollers 41, 42 and 43. Accordingly, adverse effects to the delivery rollers 41, 42 and 43 suc as the increase in rotation load of each of the delivery rollers 41, 42 and 43 and damage to the delivery rollers 41, 42 and 43 can be reduced as much as possible by the synthetic paper 48 as well as the durability of the synthetic paper 48 itself can be improved.

Furthermore, the above described following characteristic are further increased by the tongue member 48c. Thus, the durability of the synthetic paper 48 is further improve and damage caused by the synthetic paper 48 to the delivery rollers 41, 42 and 43 can be more effectively prevented by the tongue member 48. Additionally, since the synthetic paper 48 is affixed, replacement thereof is easy. The replacement can be performed without removing the delivery rollers 41, 42 and 43, which is further easy. In addition, the synthetic paper 48 is not easily soiled. If it becomes soiled, it can be simply cleaned. Accordingly, the above described replacement need not be frequently performed, which does not take a lot of time or labor.

The following comparing tests are carried out with respect to the above described durability and the effects to the delivery rollers 41, 42 and 43 by continuously feeding sheets of paper to the automatic original feeder 2 using copy paper, a polyester film (Mylar, 50 $\mu$m thick), urethane rubber, and the above described YUPO as the synthetc paper 48.

As a result, the following have become clear. The above described copy paper has the disadvantage in durability because it is torn when approximately 5000 sheets of paper are fed. The polyester film causes stripping on the cylindrical surfaces of the delivery rollers 41, 42 and 43, so that adverse effects to the delivery rollers 41, 42 and 43, are large. The urethane rubber causes stripping on the cylindrical surfaces of the delivery rollers 41, 42 and 43 when approximately 1000 sheet of paper are fed because contact resistance between the urethane rubber and each of the delivery rollers 41, 42 and 43 is large due to the impossibility to decrease the thickness of the urethane rubber, so that adverse effects to the delivery rollers 41, 42 and 43 are very large. The above described YUPO does not change if 20000 to 30000 or more sheets of paper are fed and does not cause stripping on the cylindrical surfaces of the delivery rollers 41, 42 and 43. Accordingly, it is found that the YUPO is the most suitable for use as the synthetic paper 48.

Figure 14:
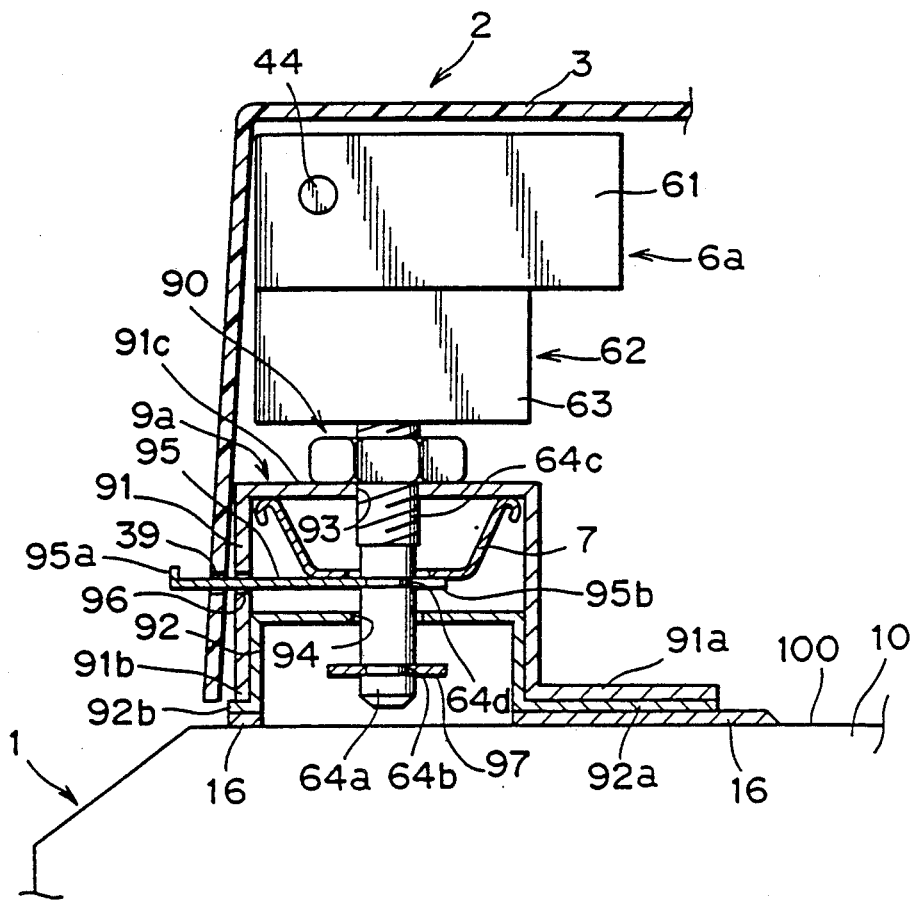
FIG. 14 is a cross-sectional view showing a frame-supporting assembly according to another embodiment of the present invention.
Figure 15:
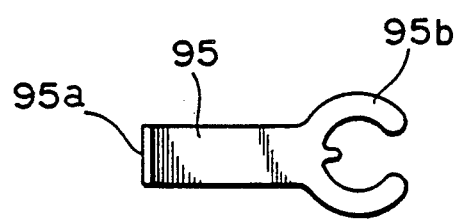
FIG. 15 is a plan view of a spring washer.
Figure 16:
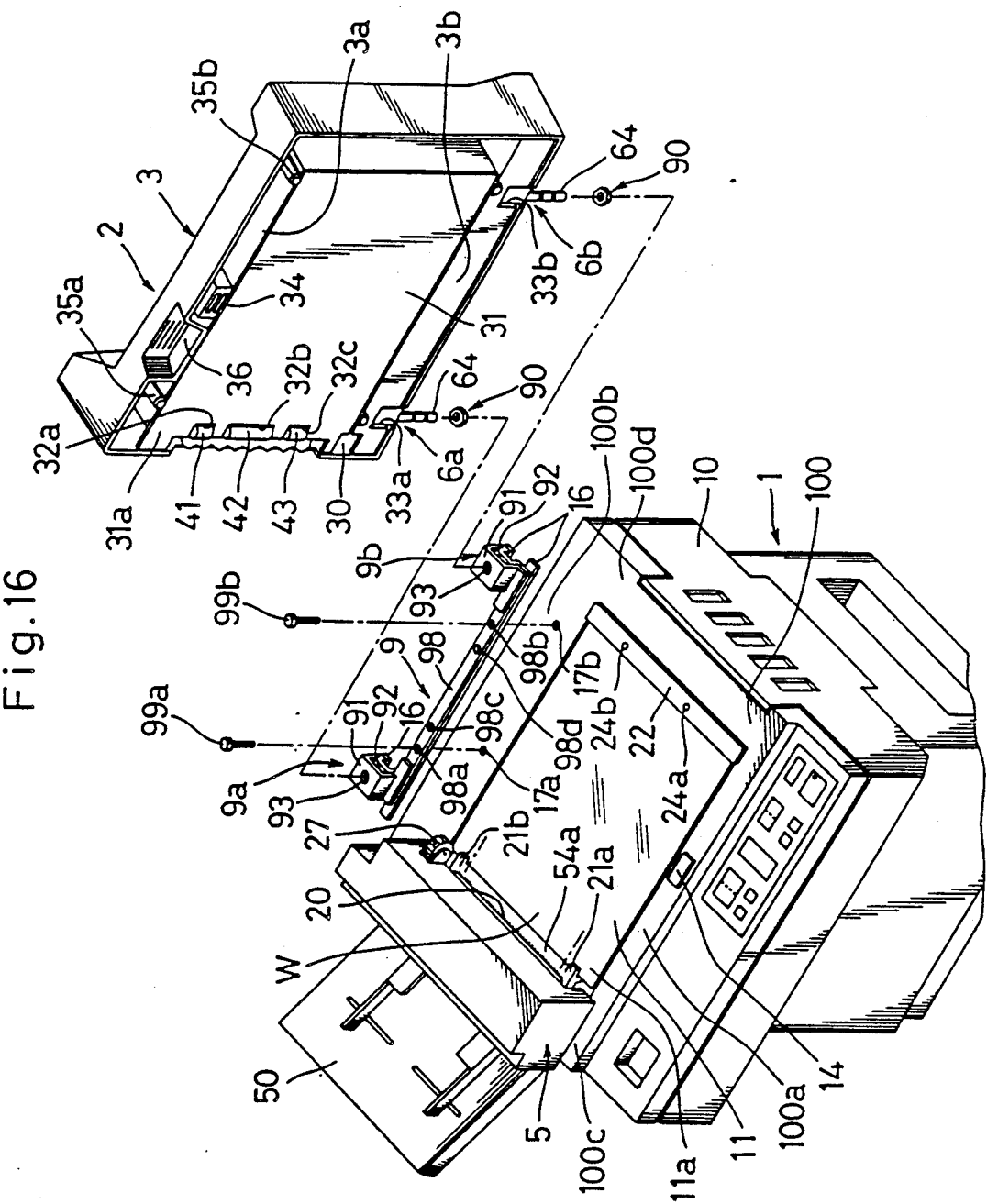
FIG. 16 is an exploded perspective view showing the whole of the image forming apparatus.

FIGS. 14 to 16 illustrate a main part of an image forming apparatus in which the height of a frame 3 from a transparent platen 11 can be adjusted. An adapted member 9 comprising a pair of attaching means 9a and 9b and a connecting portion 98 is disposed on an upper surface 100 of a housing 10 in the main body of an electrophotographic copying apparatus 1, the frame 3 in an automatic orignal feeder 2 being attached to the main body of the electrophotographic copying apparatus 1 through this adaptor member 9. Hinge units 6a and 6b are respectively supported by the attaching means 9a and 9b, and the frame 3 in the automatic original feeder 2 is rotatably supported by the hinge units 6a and 6b.

The attaching means 9a and 9b have the same structure, which are arranged with predetermined spacing along a rear edge portion 11d of the transparent platen 11. The attaching means 9a has a pair of upper member 91 and lower member 92 having a U-shaped cross section which are vertically opposed to each other. The upper member 91 and the lower member 92 are respectively provided with vertical through-holes 93 and 94. A flange portion 91a extends in a front edge of the upper member 91. Flange portions 92a and 92b respectively extend in a front edge and a rear edge of the lower member 92. The upper member 91 and the lower member 92 are combined with each other with the flange portion 91a of the upper member 91 being in close contact with the flange protion 92a of the lower member 92 and a rear edge 91b of the upper member 91 being in close contact with the flange portion 92b of the lower member 92.

Furthermore, the lower member 92 of the attaching means 9a and the lower member 92 of the attaching means 9b are integrally connected to each other by a connecting portion 98. The connecting portion 98 is provided with a pair of through-holes 98a and 98b corresponding to a pair of tapped holes 17a and 17b for attaching an original-holding cover provided on the upper surface 100 of the housing 10. Screws 99a and 99b fed through the screw through-holes 98a and 98b are respectively threaded into the tapped hols 17a and 17b, so that the connecting portion 98 is secured to the upper surface 100 of the housing 10.

Furthermore, the connecting portion 98 is provided with a pair of screw through-holes 98c and 98d corresponding to a pair of tapped holes for attaching an original-holding cover in the main body of another type of electrophotographic copying apparatus. Thus, one type of automatic original feeder 2 can be attached to the main bodies of the two types of electrophotographic copying apparatuses. Accordingly, cost reduction due to quantity production can be achieved. The connecting portion 8 may be provided with three or more pairs of screw through-holes, to make it possible to cope with three or more types of electrophotographic copying apparatuses. Since the adapter member 9 is attached to the upper surface 100 of the housing 10, the attaching work is easy. Rubber 16 of suitable thickness and hardness is disposed between a lower surface of the lower member 92 and the upper surface 100 of the housing 10. The rubber 16 allows the impact or the like at the time of the opening and closing of the frames to be absorbed.

The hinge unit 6a differs from the hinge unit 6a shown in FIG. 1 in that a screw portion 64c is provided in an upper part of a shaft 64 and a circumferential groove portion 64d is provided in the central portion of the shaft 64. The shaft 64 is fed through the through-hole 93 of the upper member 91 and the through-hole 94 of the lower member 94, which is supported movably up and down by the through-holes 93 and 94. A spring washer 95 (see FIG. 15) having an E-like ring portion 95b made of resins or the like is removably fitted to the grooved portion 64d of the shaft 64. A compression flat spring 7 is movably fitted between the spring washer 95 of the shaft 64 and the upper member 91. The shaft 64 is urged downward by this compression flat spring 7, so that the hinge unit 6a is urged downward.

The above described spring washer 95 exposes a holding portion 95a to the outside of the frame 3 through the through-hole 39 of the frame 3 and a through-hole 96 of the upper member 91. The spring washer 95 can be easily removed from the shaft 64 from outside by pulling this holding portion 95a. In addition, a stopper 97 for regulating the upward movement of the shaft 64 at a predetermined height is removably fitted to a groove portion 64b of the shaft 64. This stopper 97 has the same structure as that of the above described spring washer 95, which can be easily removed from outside.

According to the present embodiment, the same effect as that according to the embodiment shown in FIG. 1 as well as the following effect are achieved. The screw portion 64c of the shaft 64 is threaded into a nut 90. This nut 90 abuts on an upper surface 91c of the upper member 91. Thus, the minimum height of the frame 3 from the original platen 11 can be adjusted by performing an rotating operation of the nut 90 to move the shaft 64 up and down.

Since the nut 90 can directly move the shaft 64 up and down, the operating force for rotating the nut 90 may be small. In addition, since the above described rotating operation can be performed from outside with the frame 3 being closed, the adjustment can be easily performed.

Additionally, since the hinge units 6a and 6b are respectively supported by the attaching means 9a and 9b disposed on the upper surface 100 of the housing 10, attaching portions of the hinge units 6a and 6b can be exposed to the outside of the housing 10 in the main body of the electrophotographic copying apparats 1. The attaching portions of the above described hinge units 6a and 6b thus exposed to the outside are removed, thereby to allow the automatic original feeder 2 to be easily removed. In addition, the spring washer 95 and the stopper 97 can be removed from the outside of the frame 3, thereby to allow the automatic original feeder 2 to be more easily removed.

Meanwhile, in the above described each embodiment, only the hinge unit 6a close to the delivery rollers 41, 42 and 43 can be urged downward by the compression coil spring 7 or the compression plate spring 7.

In this case, as described above, attaching portions of the delivery rollers 41, 42 and 43 of the frame 3 are urged upward by the upward urged force which a transfer gear 38 receives from a driving transfer gear 27. However, against this urged force, the delivery rollers 41, 42 and 43 can be held downward by urging the above described hinge unit 6a downward. Thus, the pressure applied to the original by the delivery rollers 41, 42 and 43 can be properly maintained, so that the original can be reliably conveyed.

In the embodiment shown in FIG. 1, the pressure applied to the original by the delivery roller 41, 42 and 43 can be adjusted to be proper by only adjusting the height using the bolt 8 without providing the compression coil spring 7. Similarly, in the embodiment shown in FIG. 14, the pressure applied to the original by the delivery rollers 41, 42 and 43 can be adjusted to be proper by only adjusting the height using the nut 90 without providing the compression plate spring 7. Additionally, the image forming apparatus according to the present invention is not limited to the above described embodiments. Various modifications in design can be made within the range in which the gist of the present invention is not changed. For example, only one hinge unit or three or more hinge units can be provided. Another known hinge unit structure can be used as a structure of the hinge unit. A known supporting mechanism performing the same function as that of the hinge unit can be used in place of the hinge unit. Moreover, a delivery belt of almost the same size as that of the delivery roller can be used in place of the delivery roller.

What is claimed is:

1. An image forming apparatus provided with an automatic original feeder for conveying an original, comprising,
   a main body,
   a transparent platen for supporting an original on the main body,
   a frame which is movably to a position where it covers an original which is on the transparent platen,
   an original conveying means on said frame for moving an original which is on the transparent platen,
   at least one supporting member attached movably up and down to the main body of the image forming apparatus, said supporting member rotatably supporting said frame, and,
   urging means for elastically moving said supporting member downward, said frame having an original cover plate opposable to the transparent platen, said original conveying means and the original cover plate having a clearance therebetween which is covered with at least one clearance covering member having almost the same color tone as those of the original conveying means and the original cover plate, said clearance covering member comprising a body which includes a plurality of fine flexible elements extending across the clearance.

2. The image forming apparatus according to claim 1, wherein said original conveying means comprises a delivery roller.

3. The image forming apparatus according to claim 1, wherein said original conveying means comprises a delivery belt.

4. The image forming apparatus according to claim 1, wherein said clearance covering member includes a pile material.

5. The image forming apparatus according to claim 1, wherein said supporting member comprises a hinge unit allowing the opening and closing of said frame.

6. The image forming apparatus according to claim 1, wherein said supporting member is attached to the main body of the image forming apparatus through an adapter member provided on an upper surface of the main body of the image forming apparatus.

7. An image forming apparatus provided with an automatic original feeder for conveying an original, comprising, a main body, a transparent platen for supporting an original on the main body, a frame which is movable to a position where it covers an original which is on the transparent platen, an original conveying means on said frame for moving an original which is one the transparent platen, at least one supporting member attached movably up and down to the main body of the image forming apparatus, said supporting member rotatably supporting said frame, and, urging means for elastically moving said supporting member downward, said frame having an original cover plate opposable to the transparent platen, said original conveying means and the original cover plate having a clearance therebetween which is covered with at least one clearance covering member having almost the same color tone as those of the original conveying means and the original cover plate, said original conveying means including a delivery roller which has end surfaces, and said clearance covering member includes a body which has a plurality of fine flexible elements extending across the clearance, said clearance covering member being attached to said end surfaces of the delivery roller so as to block a clearance between said end surfaces of the delivery roller and the original cover plate.

8. An image forming apparatus provided with an automatic original feeder for conveying an original, comprising, a main body, a transparent platen for supporting an original on the main body, a frame which is movable to a position where it covers an original which is on the transparent platen, an original conveying means on said frame for moving an original which is on the transparent platen, at least one supporting member attached movably up and down to the main body of the image forming apparatus, said supporting member rotatably supporting said frame, and, urging means for elastically moving said supporting member downward, said frame having an original cover plate opposable to the transparent platen, said original conveying means and the original cover plate having a clearance therebetween which is covered with at least one clearance covering member having almost the same color tone as those of the original conveying means and the original cover plate, said original conveying means comprising a delivery roller which has a cylindrical surface, and said clearance covering member includes a body which includes a plurality of fine flexible elements extending across the clearance, said clearance covering member being attached to said original cover plate so as to block a clearance between the cylindrical surface of said delivery roller and the original cover plate.

9. An image forming apparatus provided with an automatic original feeder for conveying an original, comprising, a main body, a transparent platen for supporting an original on the main body, a frame which is movable to a position where it covers an original which is on the transparent platen, an original conveying means on said frame for moving an original which is on the transparent platen, at least one supporting member attached movably up and down to the main body of the image forming apparatus, said supporting member rotatably supporting said frame, and, urging means for elastically moving said supporting member downward, said original conveying means being reversible to convey an original to an from the transparent platen in opposite directions, said automatic original feeder having original feeding means for feeding originals along a path to said original conveying means one at a time, said original feeding means having a pair of holding extension means for holding down the transparent platen, said holding extension means being on both sides of said path through which the originals are fed, said transparent platen having an infeed/outfeed end which is near the original feeding means, said infeed/outfeed end of the transparent platen having an inclined surface located along said path of originals for facilitating introduction of an original from the original feeding means to the transparent platen.

10. An image forming apparatus provided with an automatic original feeder for conveying an original, comprising, a main body having a through-hole, a transparent platen for supporting an original on the main body, a frame which is movable to a position where it covers an original which is on the transparent platen, an original conveying means on said frame for moving an original which is on the transparent platen, at least one supporting member attached movably up and down to the main body of the image forming apparatus, said supporting member rotatably supporting said frame, a shaft provided on said supporting member and having a screw portion fed through said through-hole of the main body of said image forming apparatus, and adjustable stop means for limiting downward movement of the supporting member to set a minimum height of the frame and to control the pressure applied to an original by the original conveying means, said adjustable stop means including a nut threaded onto the screw portion of said shaft.

11. The image forming apparatus according to claim 10, wherein said shaft is elastically urge downward.

12. An image forming apparatus provided with an automatic original feeder for conveying an original, comprising, a transparent platen for supporting an original, a frame which is movable to a position where it covers an original which is on the transparent platen, an original conveying means on said frame for moving an original which is on the transparent platen, an original cover plate provided on said frame and opposable to the transparent platen, said original cover plate and said original conveying means having a clearance therebetween, at least one clearance covering member having substantially the same color tone as those of the original conveying means and the original cover plate, said clearance covering member covering a clearance between the original conveying means and the original cover plate, said clearance covering member having a body which has a plurality of fine flexible elements extending therefrom.

13. The image forming apparatus according to claim 12, wherein said body is a pile material.

14. The image forming apparatus according to claim 12, wherein said clearance covering member is attached to the original cover plate.

15. An image forming apparatus provided with an automatic original feeder for conveying an original, comprising, a transparent platen for supporting an original,
a frame which is movable to a position where it covers an original which is on the transparent platen,
an original conveying means on said frame for moving an original which is on the transparent platen,
an original cover plate provided on said frame and opposable to the transparent platen, said original cover plate and said original conveying means having a clearance therebetween,
at least one clearance covering member having substantially the same color tone as those of the original conveying means and the original cover plate, said clearance covering member covering a clearance between the original conveying means and the original cover plate, wherein said original conveying means comprises a delivery roller having end surfaces, and said clearance covering member comprises annular bodies which include a plurality of fine flexible elements, said bodies being attached to said end surfaces of the delivery roller so as to block clearances between said end surfaces of the delivery roller and the original cover plate.

16. An image forming apparatus provided with an automatic original feeder for conveying an original, comprising, a transparent platen for supporting an original,
a frame which is movable to a position where it covers an original which is on the transparent platen,
an original conveying means on said frame for moving an original which is on the transparent platen,
an original cover plate provided on said frame and opposable to the transparent platen, said original cover plate and said original conveying means having a clearance therebetween,
at least one clearance covering member having substantially the same color tone as those of the original conveying means and the original cover plate, said clearance covering member covering a clearance between the original conveying means and the original cover plate, wherein said original conveying means includes a delivery roller having a cylindrical surface, and said clearance covering member is attached to said original cover plate so as to block a clearance between said cylindrical surface of said delivery roller and the original cover plate, said clearance covering member having a body which has a plurality of fine flexible elements extending therefrom.

17. An image forming apparatus provided with an automatic original feeder for conveying an original, comprising, a transparent platen for supporting an original,
a frame which is movable to a position where it covers an original which is on the transparent platen,
an original conveying means on said frame for moving an original which is on the transparent platen,
an original cover plate provided on said frame and opposable to the transparent platen, said original cover plate and said original conveying means having a clearance therebetween,
at least one clearance covering member having substantially the same color tone as those of the original conveying means and the original cover plate, said clearance covering member covering a clearance between the original conveying means and the original cover plate, said original conveying means being reversible to convey an original in opposite directions to and from the transparent platen, wherein said clearance covering member includes synthetic paper affixed to the original cover plate, said synthetic paper being cut to provide a tongue means which engages the original conveying means and is operable to follow forward and reverse movement of the original conveying mean.

18. An image forming apparatus provided with an automatic original feeder for conveying an original, comprising, a transparent platen for supporting an original,
a frame which is movable to a position where it covers an original which is on the transparent platen,
an original conveying means on said frame for moving an original which is on the transparent platen,
said original conveying means being reversible to convey the original conveyed in opposite directions to and from the transparent platen,
said automatic original feeder having original feeding means for feeding originals along a path to said original conveying means one at time, and,
a pair of holding extension means for holding down the transparent platen, said holding extension means being on both sides of said path along which the originals are fed,
said transparent platen having an infeed/outfeed end which is near the original feeding means, said infeed/outfeed end of the transparent platen having an inclined surface located along said path of originals for facilitating introduction of an original from the original feeding means to the transparent platen.

19. An image forming apparatus provided with an automatic original feeder for conveying an original, comprising, a main body,
a transparent platen for supporting an original on the main body,
a frame which is movable to a position where it covers an original which is on the transparent platen,
an original conveying means on said frame for moving an original which is on the transparent platen,
original feeding means adjacent to said frame for conveying the original to the original conveying means, said original feeding means having a driving portion for driving the original conveying means and exerting an upward force on the frame, at least two supporting members attached movably up and down to the main body of the image forming apparatus,
said supporting members rotatably supporting said frame, and,
urging means for elastically moving downwardly, against said upward force, at least the supporting member which is nearer to the original conveying means.

* * * * *